United States Patent [19]

Kawata

[11] Patent Number: 4,645,335
[45] Date of Patent: Feb. 24, 1987

[54] FOCUS ADJUSTING MECHANISM IN EXPOSURE OPTICAL APPARATUS

[75] Inventor: Shun Kawata, Hachioji, Japan

[73] Assignee: Konishiroku Photo Industry Co., Ltd., Tokyo, Japan

[21] Appl. No.: 768,497

[22] Filed: Aug. 22, 1985

[30] Foreign Application Priority Data

Aug. 28, 1984 [JP] Japan .................. 59-179019

[51] Int. Cl.$^4$ .............................. G03B 27/52
[52] U.S. Cl. ....................... 355/55; 355/57
[58] Field of Search .............. 355/8, 3 R, 55, 57

[56] References Cited

U.S. PATENT DOCUMENTS 4,155,641  5/1979  Sagara et al. ............... 355/8
4,209,248  6/1980  Gibson et al. ............. 355/574

Primary Examiner—Richard A. Wintercorn
Attorney, Agent, or Firm—Jordan B. Bierman

[57] ABSTRACT

In an electrophotographic copying machine of a type in which an original table is fixed, a wire is stretched over pulleys provided on two movable members so that a slit for scanning an orignal and a set of reflecting mirrors for reflecting light from the slit towards a lens may be moved at a ratio of 2:1.

According to this invention, an endless wire having the opposite ends of the wire connected is used, and an adjusting screw capable of adjusting a spacing between both the movable members by turning the screw is provided at the connected portion, and focussing can be made by turning the adjusting screw. If this adjusting screw is made to expose to the outside of the copying machine body, focussing can be made from outside.

10 Claims, 3 Drawing Figures

FOCUS ADJUSTING MECHANISM IN EXPOSURE OPTICAL APPARATUS

BACKGROUND OF THE INVENTION

1. Field of the Invention

The present invention relates to a slit exposure optical apparatus used for, for example, an electrophotographic copying machine, and more particularly, to a focus adjusting mechanism thereof.

2. Description of the Prior Art

As is known, in an electrophotographic copying machine of the type in which an original table is fixed, two movable tables are used to maintain constant a light path length of an original image incident upon a projecting lens. More particularly, FIG. 3 illustrates an exposure optical apparatus having the construction as described, and a first movable table 4 which moves along guide rails (not shown) and guide rods 3 on opposite sides of an optical system box 1 comprises a slit plate 6 for scanning an original (not shown) illuminated by an illuminating lamp 5 and a first mirror 7 which reflects an incident light from a slit 6a of the slit plate 6. A second movable table 8 that may be moved in a direction similar to that of the first movable table 4 comprises a second mirror 9 receiving a reflected light from the first mirror 7 and a third mirror 10, the third mirror 10 causing the reflected light from the second mirror 9 to incident upon a projecting lens 11. Accordingly, in the first movable table 4 and second movable table 8 constructed as described above, the second movable table 8 has to be moved in the same direction at a speed of one half (½) with respect to the first movable table 4 to maintain constant an incident light path length relative to the projecting lens 11. In the past, however, to attain such synchronous drive, a wire pulley device as shown is used between a fixed portion of the device and the first and second movable tables 4, 8. This wire puley device will be further described. The wire pulley device comprises a pair of fixed pulleys 12, 13 opposedly provided in a moving direction of the first and second movable tables 4, 8, two relay pulleys 14, 15 positioned in the middle between the fixed pulleys 12, 13, two movable pulleys 16, 17 supported on ends of the second movable table 8, and a driving drum 18 rotated by a motor not shown. A wire 20 one end of which is fixed to a stay 19 of the optical system box 1 is stretched over the movable pulley 16, thereafter fixed to an end 4a of the first movable table 4, reversed at the fixed pulley 12, passes through the relay pulley 14, the driving drum 18, the relay pulley 15 and the fixed pulley 13 in said order, stretched over the movable pulley 17, and the other end of the wire is fixed to a stay 21.

In the above-mentioned exposure optical apparatus, a distance L from the first movable table 4 to the second movable table 8 is adjusted so as to have a fixed incident light path length to adjust focus. However, in the construction as described above, a fixing screw 22 of the end 4a of the first movable table which fixes the wire 20 is untightened to change the relation between the first movable table 4 and the wire 20. In this case, there is only one method which pulls the wire fixed to the screw by a turning amount of the screw using an adjusting screw. Therefore, in the past, an original table glass (not shown) or other cover is removed to expose the first movable table end 4a, thereby adjusting the focussing operation. However, such a partial disassembling operation involves cumbersome operations in terms of manufacturing process, maintenance and management, and the focussing time becomes extended.

SUMMARY OF THE INVENTION

In view of the problem involved in prior art focussing as previously mentioned, it is an object of the present invention to provide a construction which can carry out focussing without requiring disassembling of the original table glass and other parts.

To achieve the above-described object, the present invention provides a slit exposure optical apparatus in which a first movable table having an illuminating lamp and a slit plate and a second movable table having a mirror mounted thereon are synchronously moved by a wire pulley device, in which apparatus, a part of an apparently endlessly formed wire is wound on an adjusting screw provided on a fixed portion, and the distance between the exposure optical apparatus, the first movable table and the second movable table is adjusted by the turning of said adjusting screw.

DETAILED DESCRIPTION OF THE PREFERRED EMBODIMENT

Figure 1:
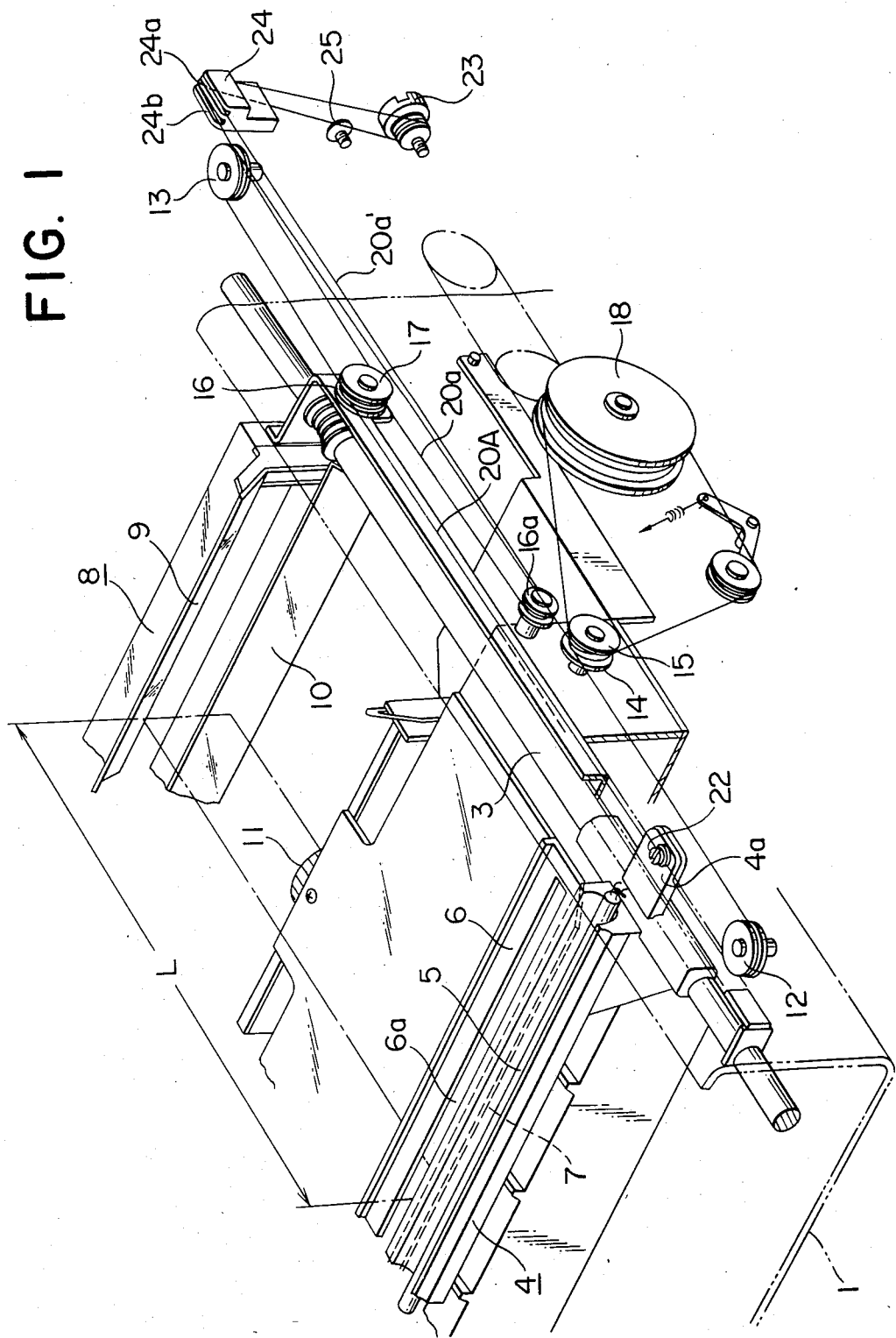
FIG. 1 is a perspective view of an exposure optical apparatus embodying the present invention.
Figure 2:
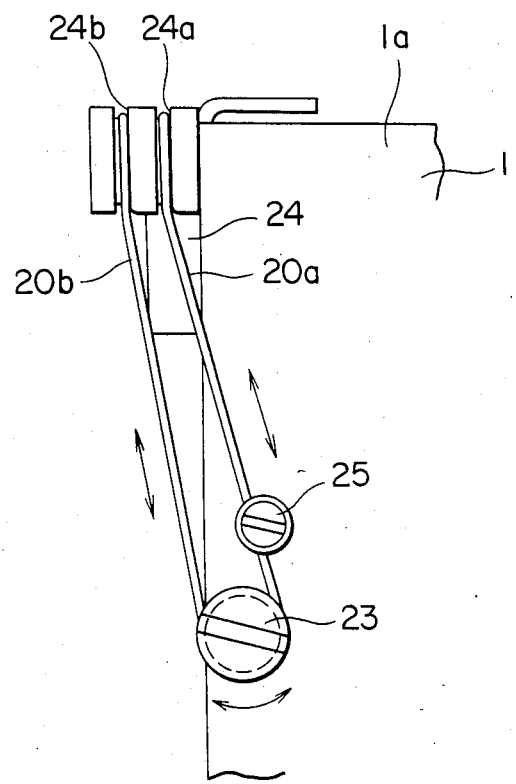
FIG. 2 is an enlarged side view showing essential parts of the exposure optical apparatus.

Referring now to FIGS. 1 and 2, the embodiment of the present invention will be described in detail.

Figure 3:
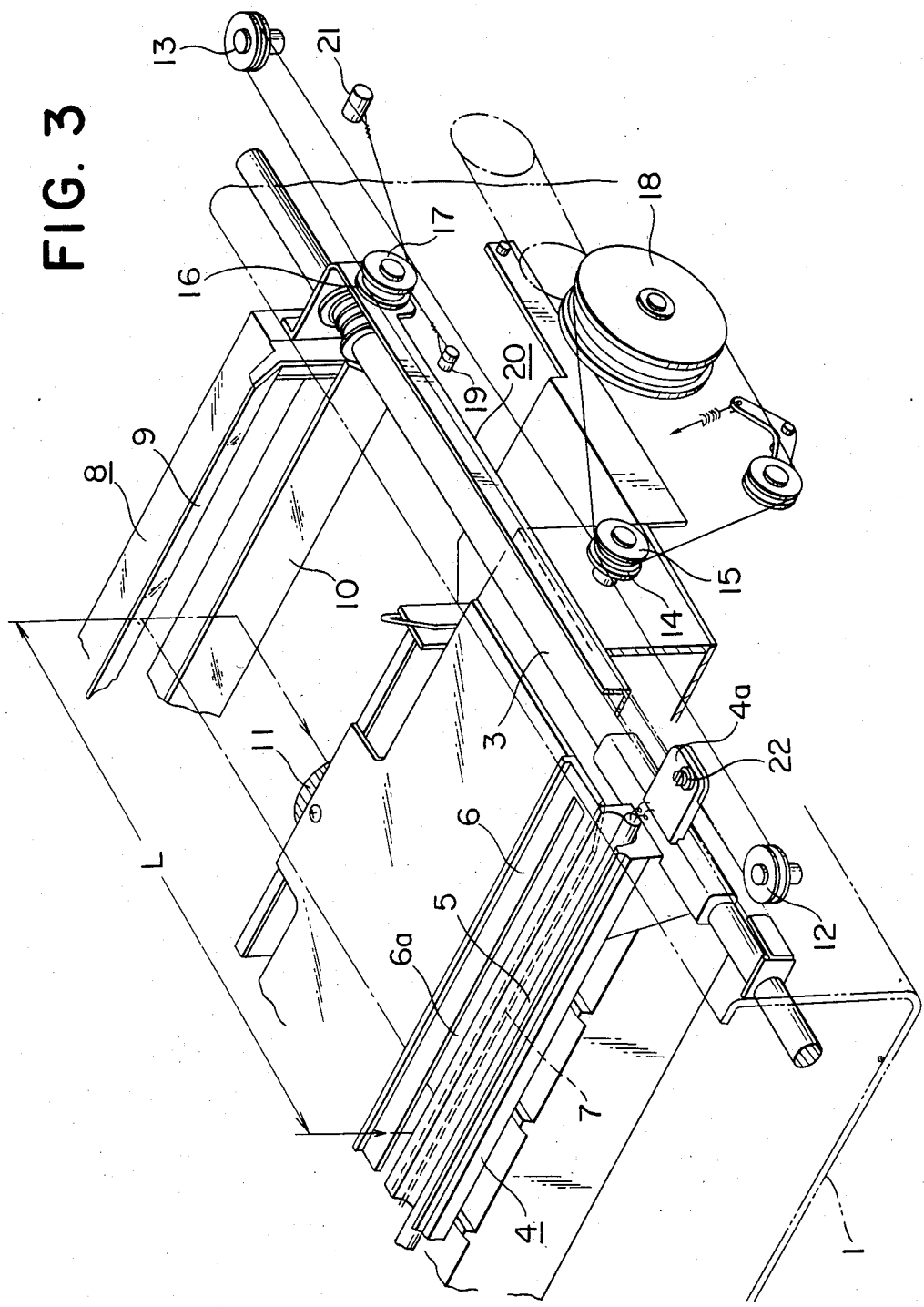
FIG. 3 is a perspective view corresponding to FIG. 1 of a conventional exposure optical apparatus.

FIG. 1 is a perspective view corresponding to FIG. 3 showing an embodiment of the present invention. In FIG. 1, the same parts as those of FIG. 3 bear the same reference numerals as those of FIG. 3.

As may be understood from comparison between FIG. 1 and FIG. 3, the present invention is characterized by a wire 20A formed apparently endlessly, and a rotatable adjusting screw 23 provided on the end of an optical system box 1 and on which a part of the wire 20A is wound.

More specifically, an intermediate portion 20a of a wire which is guided from an end 4a of a first movable table is stretched over a rotatable wire stretching member 16a provided on the optical system box 1 through a movable pulley 16, the wire is reversed, the wire 20a is then extended to a guide groove 24a within a guide 24 provided on the end of the optical system box 1, and the wire is wound on an adjusting screw 23 a portion of which is exposed externally of the copying machine. Thereafter, the wire is again guided into the guide groove 24b, the extended portion of the wire 20a is stretched over a movable pulley 17 justaposed to the movable pulley 16 and stretched on the fixed pulley 13. The wire 20a is returned to a relay pulley 15 and wound on a driving drum 18, after which the wire is returned to the first movable table end 4a through the relay pulley 14 and fixed pulley 12.

Into the outer surface 1a of the optical system box 1 is screwed a locking screw 25 for locking the intermediate portion 20a of the wire 20A to the optical system box 1, as shown in FIG. 2.

The exposure optical apparatus according to the illustrated embodiment being constructed as described above, focussing in a direction of coming the distance L between the first movable table 4 and the second movable table 8 closer can be made merely by turning the adjusting screw 23 with the locking screw 25 untightened. That is, the intermediate portion 20a of the wire between pulleys 13 and 17 is untightened by turning the adjusting screw 23, and, therefore, the movable pulley 17 connected to second movable table 8 becomes being capable of moving towards the first movable table 4

At the same time, since the intermediate portion 20a of the wire between pulleys 17 and 16 is pulled toward pulley 16a, movable pulley 17 is pulled toward first movable table 4. After all, the second movable table 8 is moved towards the first movable table 4 by the distance equal to the one half (½) of the pulling amount of the intermediate portion 20a of the wire. Accordingly, if the locking screw 25 is tightened after the distance L between the first movable table 4 and the second movable table 8 has been set by the turning of the adjusting screw 23, the wire 20A is completely locked to the optical system box 1. Therefore, the first movable table 4 and second movable table 8 can be reciprocated by the driving drum 18.

It is needless to point out that the aforementioned focussing operation can be carried out simply without removing an original table glass or the like, since such operation is done at the outer surface 1a of the optical system box 1.

As will be apparent from the foregoing, according to the present invention, focussing can be carried out merely by manually adjusting from outside the adjusting screw on which the apparently endlessly formed wire is wound. Therefore, as compared with the conventional focussing construction, focussing can be done quickly and positively without requiring disassembling an original table glass or the like, thus providing an advantage in that when an error occurs in manufacturing process and light path length, such adjustment of error can be made in a short period of time during the maintenance and magnagement process.

What is claimed is:

1. A device for adjusting a focusing condition of a scanning apparatus comprising:
    a first table comprising an illuminating lamp for exposing an original and a first mirror,
    a second table comprising a second mirror for reflecting a slit ray reflected by said first mirror to a predetermined position, said second table comprising at least one pulley,
    an adjusting screw rotatably mounted on a housing wherein said scanning apparatus is mounted, said adjusting screw being exposed outside the housing,
    a wire member wound around a driving drum, a first portion of said wire member extending from said driving drum in a first direction and being fixed to said first table, said first portion being wound around said at least one pulley and around said adjusting screw, a second portion of said wire member extending from said driving drum in a second direction and being wound around said at least one pulley and around said adjusting screw,
    locking means for selectively locking said wire member, whereby said second mirror is moved in absence of movement of said first mirror by rotating said adjusting screw after releasing said locking means.

2. The device of claim 1 wherein said locking means is a locking screw.

3. The device of claim 2 wherein said locking screw is mounted on said housing and exposed outside the housing.

4. The device of claim 3 wherein said locking screw locks said wire member near said adjusting screw.

5. The device of claim 1, further comprising a stationary fixed pulley between said at least one pulley and said adjusting screw.

6. A device for adjusting a focusing condition of a scanning apparatus comprising:
    a first movable table having an illuminating lamp, a slit plate and a first mirror for scanning an original image and further having a linkage member for moving therewith,
    a second movable table having a second mirror for reflecting said scanned image and having a movable pulley member for moving therewith,
    a lens means for projecting said reflected image on a predetermined position,
    a plurality of stationary pulley members and an adjusting screw member both installed on a stationary portion, and
    a wire member wound around a driving drum and extending to said linkage member, through said movable pulley member, through said plurality of stationary pulley members, and through said adjusting screw member,
    whereby said first movable table and said second movable table are moved for scanning said original image by said driving drum through said endless wire, thereby maintaining a predetermined light length between said first movable table, said second movable table and said lens member, whereby said predetermined light length can be adjusted by turning said adjusting screw.

7. The device of claim 6 wherein said plurality of stationary pulleys comprises a first fixed pulley and a second fixed pulley opposite to each other, a first relay pulley and a second relay pulley both positioned to be coaxial, and a wire stretching pulley,
    wherein said second movable table comprises a first movable pulley and a second movable pulley both positioned to be coaxial and located between said both fixed pulleys,
    wherein said relay pulleys are between both said fixed pulleys,
    wherein said linkage member is between said first fixed pulley and said movable pulley,
    wherein said wire stretching pulley locates at the first fixed pulley-side of said movable pulleys, and
    wherein said endless wire extends from said linkage to said first movable pulley, said wire stretching pulley, said adjusting screw, said second movable pulley, said second fixed pulley, said second relay pulley, said driving drum, said first relay pulley, and said first fixed pulley in that order and is fixed to said linkage.

8. The device of claim 7 wherein said adjusting screw can be freely positioned at a desired position by means of a guide member between said adjusting screw and said wire stretching pulley.

9. The device of claim 7 wherein said light length is adjusted by moving only said second movable table and maintaining said first movable table at predetermined position by turning said adjusting screw through said endless wire.

10. A device for adjusting a focusing condition of a scanning apparatus comprising:

a first table comprising an illuminating lamp for exposing an original and a first mirror, a second table comprising a second mirror for reflecting a slit ray reflected by said first mirror to a predetermined position, said second table comprising at least one pulley, an adjusting screw;

a wire member being wound around a driving drum, a first portion of said wire member stretching from said driving drum to a first direction being fixed to said first table, said first portion being wound around said at least one pulley and around said adjusting screw, a second portion of said wire member stretching from said driving drum to a second direction being wound around said at least one pulley and around said adjusting screw, locking means for selectively locking said wire member, whereby said second mirror is moved in absence of movement of said first mirror by rotating said adjusting screw after releasing said locking means.

* * * * *